J. E. WALTERS.
MINNOW.
APPLICATION FILED JUNE 22, 1909.

969,014.

Patented Aug. 30, 1910.

Witnesses
Phil E. Barnes
R. M. Smith.

Inventor
John Elmer Walters
By Victor J. Evans
Attorney

UNITED STATES PATENT OFFICE.

JOHN E. WALTERS, OF NILES, OHIO.

MINNOW.

969,014.  Specification of Letters Patent.  Patented Aug. 30, 1910.

Application filed June 22, 1909. Serial No. 503,660.

*To all whom it may concern:*

Be it known that I, JOHN E. WALTERS, a citizen of the United States, residing at Niles, in the county of Trumbull and State of Ohio, have invented new and useful Improvements in Minnows, of which the following is a specification.

This invention relates to minnows, the object in view being to provide an artificial bait adapted to be drawn through the water and embodying a fish or minnow-like body, and a spring hook concealed for the greater part within said body and adapted to be released by the fish in the act of grabbing the minnow or bait, thus causing the same to be thrown outward automatically so as to project in position to be drawn into the mouth of the fish.

A further object of the invention is to provide a trigger of such construction and relation to the body of the bait that it may be used as a lever to pry or force the spring hook to its set and concealed position.

With the above and other objects in view, the nature of which will more fully appear as the description proceeds, the invention consists in the novel construction, combination and arrangement of parts as herein fully described, illustrated and claimed.

Figure 1:
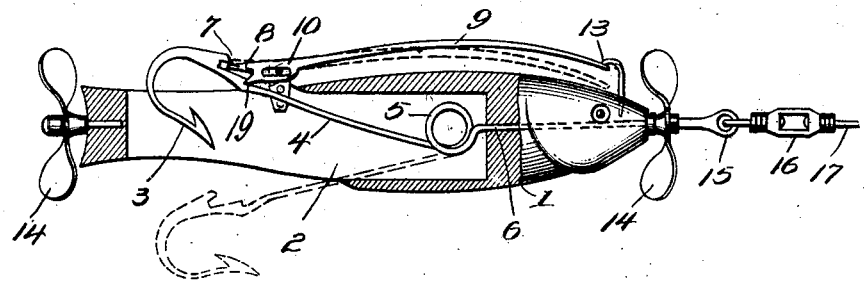
Figure 2:
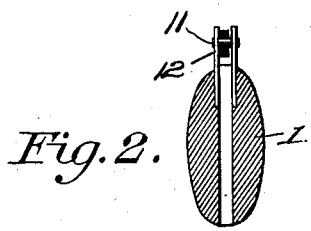
Figure 3:
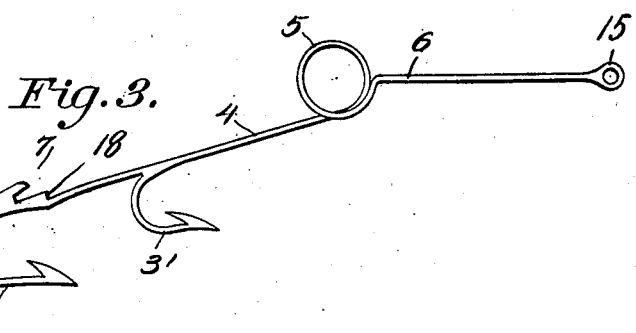

In the accompanying drawings:—Figure 1 is a longitudinal section through the device, showing the hook set in full lines and sprung in dotted lines. Fig. 2 is a cross section through the same, taken in line with the trigger pivot. Fig. 3 is a detail view of a double hook.

In the drawings, 1 designates the body of the minnow or artificial bait, the same resembling a minnow or small fish being hollowed out or recessed as shown at 2 to form a cavity or slot in which is mounted a hook 3. The hook 3 is provided with a spring shank 4 and also with a spring coil 5 terminating in a shank 6 inserted into and through the head portion of the fish and secured or fastened therein in any convenient manner. At the back of the hook there is a projecting lip 7 beneath which the point 8 of a trigger 9 is adapted to engage. This trigger is provided with a slot 10 through which passes a pivot 11 carried by oppositely arranged lugs 12 extending upward from the back of the fish as illustrated in Figs. 1 and 2, the slot 8 admitting of a slight longitudinal movement of the trigger so that it may be readily engaged under the lip 7 of the hook. The opposite or forward extremity of the trigger 9 is adapted to be carried and engaged beneath a fixed catch 13 secured to the head of the minnow or bait. It is also contemplated to provide the hook with one or more additional barbed points as shown in Fig. 3, 3 designating the main hook and 3' a supplemental or auxiliary hook located a suitable distance from the main hook. The bait may also be provided at one or both ends with spoons or whirls 14 and is preferably provided at the forward end with an eye 15 at the end of the shank 6 adapted to receive a suitable swivel 16 on the end of the line 17. In the preferred embodiment of this invention, the hook is also provided adjacent to the lip 7 with a shoulder 18 while the trigger is provided with a toe or projection 19 which, as shown in Fig. 1, acts against the shoulder 18 as the trigger arm 9 is pressed inward to slide the point 8 of the trigger out from under the lip 7 of the hook thereby effecting a release of the hook and permitting the same to spring outward to the dotted line position shown in Fig. 1. This prevents the trigger arm 9 from flying outward and makes the device as a whole very compact.

By pushing the hook 3 upward within the slotted body of the bait and sliding the trigger 9 rearward, the point 8 of the trigger may be engaged under the lip 7 on the hook after which by rocking the trigger from the dotted line position of Fig. 1 to the full line position in the same figure, the hook is carried upward until the point of the hook is entirely concealed and inclosed within the body of the bait, as shown by full lines in Fig. 1. A fish in grasping the bait, displaces the trigger 9 from beneath the catch 13 and thereby releases the hook which swings to its projecting position, thus driving the point of the hook into the mouth of the fish.

I claim:—

1. In artificial bait, a fish-like body having a recess therein, a spring hook mounted within said recess having a normal spring outward from the recess to a projecting position, a lip on the shank of the hook, and a combined trigger and lever arranged exteriorly of and fulcrumed on the body and adapted to engage the lip on the hook for holding the point of the hook within the plane of the body, the said trigger being also adapted by inward pressure thereon to release the hook, substantially as described.

2. Artificial bait comprising a fish-like body provided with a recess therein, a spring hook mounted in said recess and provided with a lip on the shank thereof, a trigger pivotally mounted on the outer side of the body and adapted to engage the lip of the hook, and means on the outer side of the body for retaining the trigger in engagement with the lip of the hook, the trigger being adapted upon being pressed toward the body to release the hook, substantially as described.

In testimony whereof I affix my signature in presence of two witnesses.

JOHN E. WALTERS.

Witnesses:
E. SWETLAND,
A. C. LODWICK.